United States Patent [19]

Park

[11] Patent Number: 6,120,144
[45] Date of Patent: Sep. 19, 2000

[54] GLASSES WITH AN UPPER PAIR OF GLASSES ATTACHED TO A LOWER PAIR OF GLASSES

[75] Inventor: Yong Jin Park, Daegu, Rep. of Korea

[73] Assignee: Sae Myung Industrial Co., Daegu, Rep. of Korea

[21] Appl. No.: 09/255,165

[22] Filed: Feb. 22, 1999

[30] Foreign Application Priority Data

Feb. 11, 1999 [KR]  Rep. of Korea ......................... 99/2181

[51] Int. Cl.[7] ....................................................... G02C 9/00
[52] U.S. Cl. ................................................. 351/47; 351/57
[58] Field of Search ................................ 351/47, 57, 41, 351/158

[56] References Cited

U.S. PATENT DOCUMENTS 5,416,537  5/1995  Sadler ......................................... 351/57
5,568,207  10/1996  Chao .......................................... 351/57
5,975,691  11/1999  Ku ............................................. 351/47

*Primary Examiner*—Hung Xuan Dang
*Attorney, Agent, or Firm*—Herold and Haines, P.A.; Brian L. Wamsley, Esq.

[57] ABSTRACT

The invention relates to a pair of glasses comprising an inner or lower pair of glasses for correcting vision deficiencies and an outer or upper pair of glasses that provides protection from the sun's rays. The outer pair is removably attached to the inner pair by means of inter-locking hooks having magnets, the inner pair having magnets located at the right and left intersections between the frame and the ear pieces. The outer pair of glasses comprises a corresponding pair of magnets located on the ends of inter-locking hooks at the right and left ends of the outer pair frame. When the outer pair and inner pair are assembled, the magnets hold the pair together by means of magnetic force while the inter-locking hooks provide additional strength and stability in the vicinity of the magnets, to allow the user more freedom to engage in activities and sports.

2 Claims, 2 Drawing Sheets

GLASSES WITH AN UPPER PAIR OF GLASSES ATTACHED TO A LOWER PAIR OF GLASSES

BACKGROUND OF THE INVENTION

1. Field of the Invention

The present invention relates to a pair of glasses having a first pair of glasses interlocked with a second pair of glasses. Specifically, an outer or upper pair of glasses is removably attachable to an inner or lower pair of glasses using inter-locking hooks with magnetic members. The lower pair consists of temples, rims, lenses, nose pads, a bridge and a pair of magnets located near and behind the right and left intersections between the frame and ear pieces. The upper pair consists of rims, lenses, a bridge and inter-locking hooks for engaging the frame of the lower pair. The ends of the inter-locking hooks contain magnets corresponding with with the magnets of the lower pair frame. The combination of the inter-locking hooks and the magnets provide stability and safety by holding the upper and lower pairs tightly together when they are assembled.

2. Description of the Prior Art

In general, there are two types of glasses; one to correct impaired vision such as near sightedness or farsightedness, and the other to protect the eyes from the sun's rays. The latter case is sunglasses with coloured lenses shielding the sun's rays.

Nowadays, people wear glasses for non-functional purposes, for example, as an accessory to change user's style and image. It is common to wear a pair of glasses because no useful device has been available for people wear both types of glasses at one time. While some users wear a single pair of glasses that both corrects vision and provides protection from the su, i.e., prescription sunglasses, a second pair of corrective glasses is also necessary when the person goes indoors or out of the sun. Thus, the need for a single pair of glasses to fill both needs is not solved.

Double-layered glasses having one pair attached to another have been known in the art. A typical such assembly is disclosed in U.S. Pat. No. 4,070,103 to Meeker. In Meeker, a spectacle frame includes a magnetic material secured to the peripheral portion for attachment of an auxiliary lens rim cover to the frame. The lens rim cover also includes a magnetic strip for engaging the magnetic material of the spectacle frame.

Another example is disclosed in U.S. Pat. No. 5,416,537 to Sadler, which comprises first magnetic members secured to the temporal portions of the frames and second magnetic members secured to the corresponding temporal portions of the auxiliary lenses.

In addition, U.S. Pat. No. 5,568,207 to Chao discloses arms having magnetic elements extended rearward from the auxiliary lens for extending over and for engaging with corresponding magnetic elements in the upper portion of the primary spectacle frame.

In these examples of eyeglasses, the auxiliary lenses are simply attached to the frame by magnetic materials and, except for Chao, have no supporting members for preventing the auxiliary lenses from moving downward relative to the frames and may be easily disengaged from the frames when the users engage in mild physical activity. Chao adds arms for limiting slippage in the downward direction, but is not helpful in preventing slippage in other directions, such as vertically or laterally, when the user engages in strenuous physical activity. The auxiliary lenses can still be easily dislodged through vibration or being bumped. Also, when the magnetic force weakens, the auxiliary pair tends to easily disengage.

In these cases, it is difficult for users to play active sports or engage in similar activities with the glasses on because the auxiliary glasses tend to become easily detached by minor shaking, motion or collision. Particularly, when the magnetic forces of the magnetic pieces wear out or weaken, the auxiliary glasses are detached too easily. Thus, with these existing double-layered glasses, safety and comfort cannot be assured.

The present invention has arisen to obviate the afore-described disadvantages of the conventional spectacle frame.

It is therefore an object of the present invention to provide a double pair of glasses, acting as a single pair, that functions to correct vision and protect against the sun's rays. It is also an object of this invention to provide a structure which holds the auxiliary glasses tightly by means of inter-locking hooks and magnets for easy removal and change, so that users can enjoy various kinds of activities ands sports comfortably and safely.

SUMMARY OF THE INVENTION

The primary objective of the present invention is to provide a pair of glasses having auxiliary lenses with increased stability and security in being supported in attachment on the frames.

In accordance with one aspect of the invention there is provided a pair of glasses having an outer pair of glasses removably attached to an inner pair of glasses and, more particularly, the outer and inner pairs of glasses are attached by means of inter-locking hooks having magnets. The magnets are strategically located at the ends of the inter-locking hooks to provide the maximum effect of the magnetic force holding the inner and outer pairs together, in conjunction with the added stability provided by the inter-locking nature of the hooks. The inter-locking hooks provide additional force in holding the two pairs tightly together so that the user is free to engage in vigorous activity and sports.

Thus, the two pairs of glasses frames are removably connected by two pairs of magnets. On the frame of the inner pair of glasses, the magnets are located at the left and right intersections between the frame and the ear pieces. The magnets, generally small and cylindrical, although they may be of any shape, are positioned horizontally and faced toward the rear of the inner frame. The outer frame comprises the lenses, rims and frame and generally excludes the ear pieces. In the location where the ear pieces would ordinarily appear from the outer frame are situated, at the right and left intersections, inter-locking hooks for placement over the frame of the inner pair of glasses, and extending behind the inner pair at the intersection between the frame and ear pieces. A magnet is located at the end of each inter-locking hook of the outer pair of glasses that corresponds to an associated magnet on the inner pair. When the outer and inner pairs are assembled, the associated magnets are juxtaposed and the pairs are held together by magnetic force.

In addition to the magnetic force, the pairs are also held more tightly together by means of the inter-locking hooks that hold the magnets of the outer pair. The interlocking hooks act much like clamps and provide a pressure-type fit of the outer pair to the inner pair.

The arrangement of the magnets of the two pairs of glasses provides a lateral and horizontal stability to the outer pair as attached to the inner pair. This is fine for ordinary use and wear, but does not provide sufficient force to secure the outer pair during sudden, vigorous movement, vibration or impact. Thus, in accordance with the within invention, the inter-locking hook mechanism provides additional force in both the horizontal and vertical directions to accomplish the objectives of the invention in all but the most severe circumstances. In those cases, the glasses would probably become broken.

BRIEF DESCRIPTION OF THE DRAWINGS

The above objects and advantages of the invention will become manifest to one skilled in the art from considering the following detailed description of an embodiment of the invention in light of the accompanying drawings, in which.

DETAILED DESCRIPTION OF THE INVENTION

Figure 1:
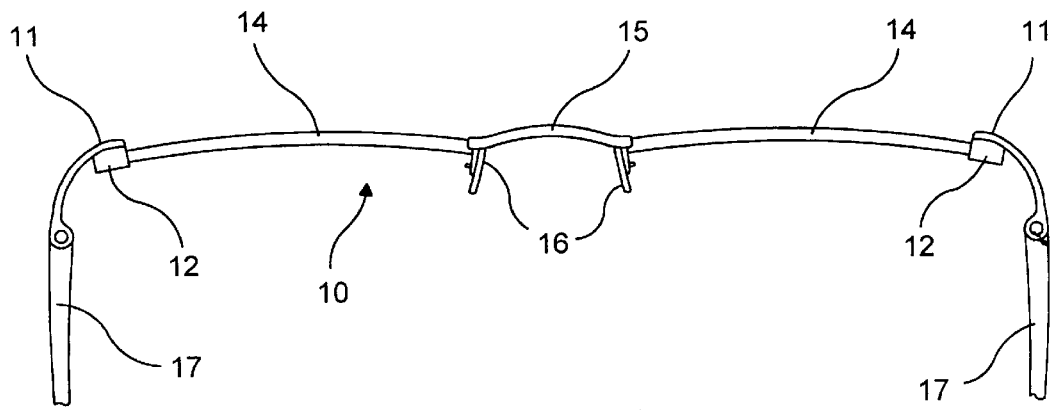
FIG. 1 is an upper view of the inner or lower pair of glasses in accordance with the present invention.

Turning now to the drawings, there is illustrated in FIG. 1 an upper view of the inner or lower pair of glasses 10, comprised of rims 14, earpieces 17, nose pads 16 and bridge 15. The left and right intersections 11 are shown between the frame and the earpieces 17. Left and right magnets 12 are located within the frame structure at the left and right intersections 11. See FIG. 5a. The magnets are generally horizontally oriented and are located behind the frame, facing the user.

Figure 2:
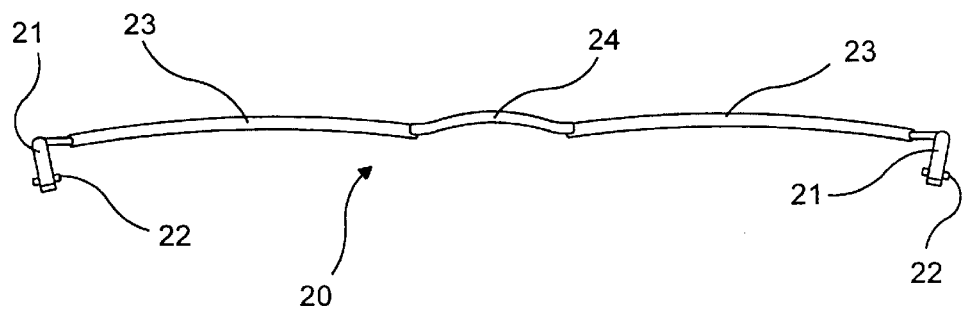
FIG. 2 is an upper view of the upper or supplementary pair of glasses in accordance with the present invention.
Figure 3:
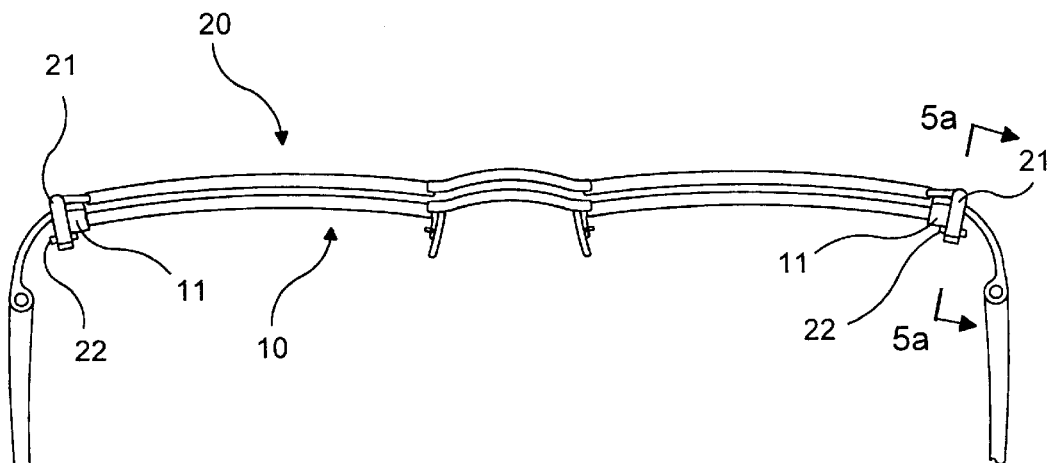
FIG. 3 is an upper view of the combined lower and supplementary pairs of glasses in accordance with the present invention.

Referring to FIG. 2, an upper view of the frame 20 of the outer or upper pair of glasses is shown. Outer pair 20 is comprised essentially of rims 23 and a bridge 24. An inter-locking hook mechanism 21 is located at each of the left and right ends of the frame 20. As seen from the top, the inter-locking hooks 21 are essentially upside down "U" shapes that extend over the top and behind the frame of the inner pair 10 and connect behind the inner pair at the intersections 11. Depending on their dimensions, the inter-locking hooks provide a horizontal pressure against the frame 10 of the inner pair when both pairs are assembled. See FIG. 3. Magnets 22 are located within the inter-locking hooks 21 at their ends. These magnets 22 are placed horizontally to align with the magnets 12 of the inner frame and have the opposite magnetic polarities than the magnets in the inner frame to provide for magnetic attractive force to hold the frames in place.

Figure 4:
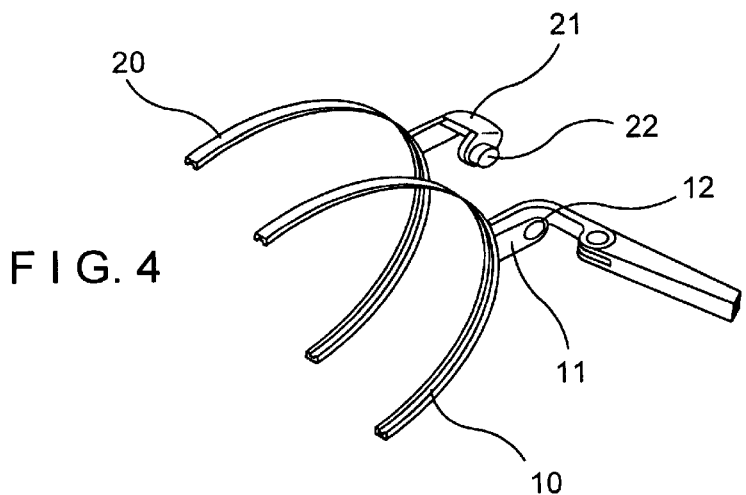
FIG. 4 is a side projection of the disassembled pairs of glasses.

The frames of the inner pair 10 and the outer pair 20 are illustrated just prior to assembly in FIG. 4. The unique shape of the inter-locking hook mechanism 21 is also clearly shown. When the frame of the outer pair 20 is placed over the frame of the inner pair 10, inter-locking hooks 21 extend over and behind frame 10, such that the vertical ends 25 of the inter-locking hooks encompass the inside and outside of frame 10. The horizontal portions of inter-locking hooks 25 can be configured to provide a tight fit of the inter-locking mechanism and provide horizontal pressure to secure the attachment of the frames. See FIGS. 5a, 5b, 6a and 6b. This additional force supplements the magnetic force supplied by the magnets, which is essential as the magnets may become weakened.

Figure 5A:
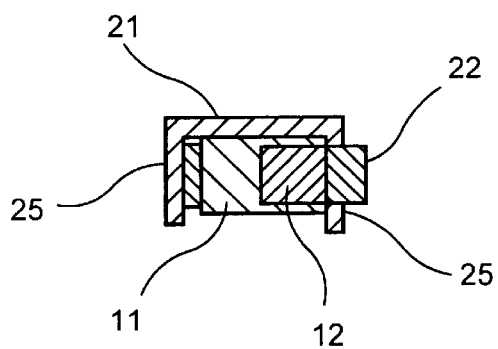
FIG. 5a is a cross-sectional view along A—A of FIG. 3, after inter-locking.
Figure 5B:
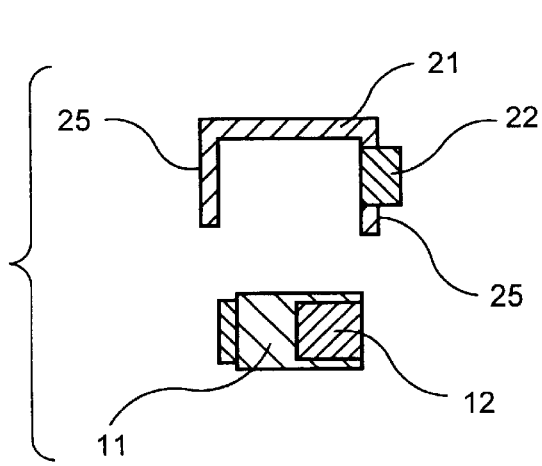
FIG. 5b is a cross-sectional view along A—A of FIG. 3, before inter-locking.

FIGS. 5a and 5b, in a cross sectional view of the hooking mechanism 21 and magnets 12, 22, illustrates the position of the magnets in the preferred embodiment. As shown, the magnets are cylindrical and are placed horizontally. When properly positioned upon assembly, the magnets 12, 22 are faced together in horizontal alignment. This provides relatively strong horizontal force, but is subject to shear force in the lateral and vertical directions. Thus, the additional force supplied by the inter-locking hook mechanism overcomes the tendency of the outer and inner pairs to separate.

Figure 6A:
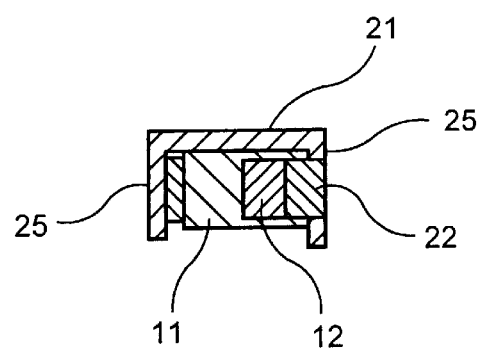
FIG. 6a is a cross-sectional view along A—A of FIG. 3 of another embodiment, after inter-locking.
Figure 6B:
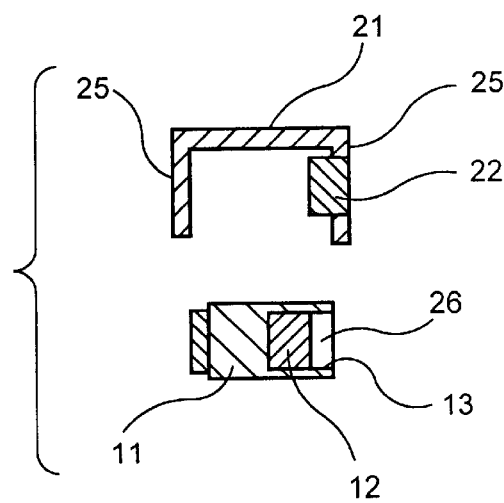
FIG. 6b is the same view as in FIG. 6a, before inter-locking.

FIGS. 6a and 6b illustrate a further embodiment of the invention. In this embodiment, the magnets 12 of the inner frame 10 are inset to provide an opening 26. The corresponding magnets 22 of the outer frame 20 can therefore be extended in the form of a pin that is insertable into the openings 26. In this manner, additional stability and comfort is imparted to the outer and inner frames when assembled.

While the present invention has been explained in relation to its preferred embodiment, it is to be understood that various modifications thereof will be apparent to those skilled in the art upon reading this specification. The invention disclosed herein is therefore intended to cover all such modifications that fall within the scope of the appended claims.

What is claimed is:

1. A pair of glasses comprising;

an inner frame for supporting optically corrective lenses, said inner frame having ear pieces pivotally attached at right and left intersections on right and left sides of said inner frame, said inner frame further having a front-side portion and a rear-side portion, a pair of first magnet members located at the right and left intersections of the inner frame between the frame and ear pieces, said first magnet members further being horizontally disposed on said rear-side portion behind the inner frame, facing the user, an outer frame for supporting an auxiliary pair of lenses, said outer frame including a left side portion and a right side portion, each side portion having an inter-locking hook extending therefrom, said interlocking hooks each comprising a horizontal member, a first vertical member and a second vertical member extending downward from ends of said horizontal member for extending over said inner frame in the location of said first magnet members, said inter-locking hooks being configured in an inverted "U" shape whereby said first and second vertical members create a pressure attachment of the outer frame to the inner frame when assembled, a pair of second magnets located horizontally within said second vertical members of said inter-locking hooks, said pair of second magnets being horizontally positioned to form magnetic attachments with said pair of first magnets in horizontal alignment with said pair of first magnets, wherein said inter-locking hooks in combination with said magnets allow said outer frame to be attached to said inner frame in a removable manner while providing secure attachment of the frames so as to prevent said outer frame from moving in a horizontal, vertical or lateral direction with respect to said inner frame and from becoming disengaged from said inner frame.

2. The glasses of claim 1, wherein said pair of first magnets is inset from the surface of the rear-side portion of the inner frame and the pair of second magnets projects from the second vertical members of said inter-locking hooks to form pins, said pins being insertable into the insets of the pair of first magnets.

* * * * *